United States Patent Office 2,720,729
Patented Oct. 18, 1955

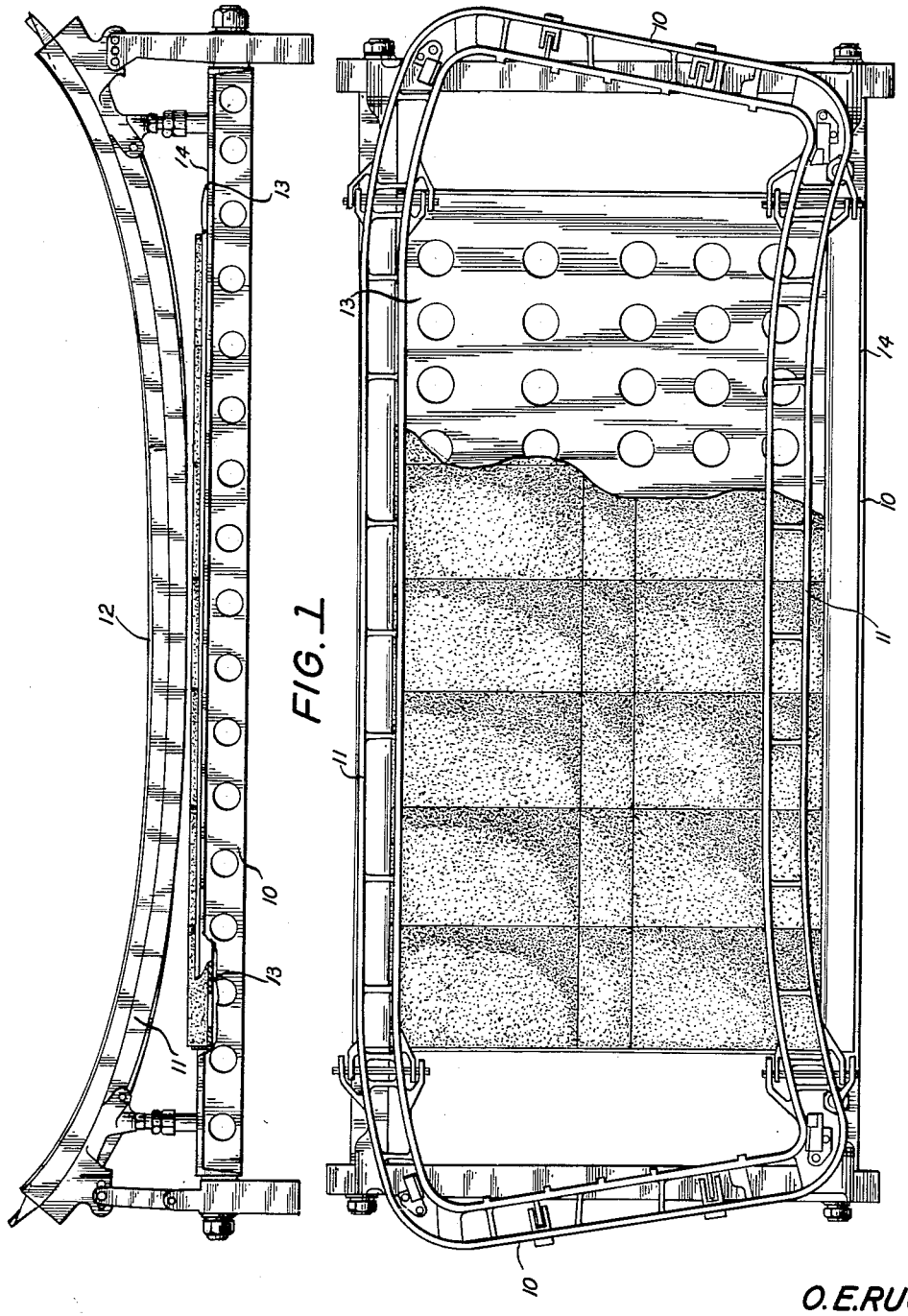

2,720,729

GLASS BENDING FIXTURE

Ormund E. Rugg, Detroit, Mich., assignor to Ford Motor Company, Dearborn, Mich., a corporation of Delaware Application October 3, 1952, Serial No. 312,947

2 Claims. (Cl. 49—65)

This invention deals with the art of bending glass, and more particularly with an improvement in an apparatus usable in the production of bent laminated glass windshields.

It is conventional in the production of bent laminated glass windshields to bend simultaneously and on one fixture, the two sheets of glass destined to form a single windshield. This is necessary because of the impossibility of bending glass in precisely the required manner other than by bending simultaneously and on the same fixture. The bending of the glass is accomplished by heating to a dull red heat (approximately 1140° F.) and permitting the glass to sag by virtue of its own weight to a position dictated by the geometry of the fixture upon which it is being bent. The fixtures usually employed for this purpose support the glass only around the edges and leave it unsupported at those portions remote from the edges. Consequently, difficulty has been encountered with the center portions of the glass sagging to a greater extent than the edges with the concomitant production of optically deflective glass. Commercially acceptacle glass should not exhibit a sag of more than ⅛ of an inch. To accomplish this very small sag, the instant invention has been developed.

For a complete understanding of this invention reference is had to the drawings in which:

Figure 1 is an elevation view of a glass bending fixture partially in section.

Figure 2 is a plan view of this fixture.

As those skilled in the art will appreciate, Figure 1 shows a glass bending fixture generally denominated as 10, in which a pair of glass sheets 12 are supported upon a bending surface 11. Inasmuch as this type of fixture is very well known further description will not be attempted except as to the novel features of this invention. To avoid the above mentioned undesirable excessive sag a layer of porous fire brick or other refractory material is placed in the fixture and supported by a perforated sheet 13 which is welded to bar 14 and which extends along the length of fixture 10. As can be seen from Figure 2, this layer of fire brick is substantially coextensive in area with the sheet of glass to be bent. While conventional sizes of fire brick may be used, it is preferred to split the ordinary fire brick lengthwise so that a section about 1¼ inch thick is obtained.

While the exact operation of this fire brick to prevent the sag is not known, it is thought that in the earlier stages of heating the fire brick preferentially absorbs heat which would otherwise be reflected from the lower portion of the bending lehr to the glass.

While porous fire brick are preferred because of their cheapness, durability and heat insulating qualities, it is to be understood that any refractory substance of like thermal characteristics may be substituted therefor.

I claim as my invention:

1. In a glass bending fixture, a frame, a glass supporting surface carried by the frame and a layer of porous fire brick supported on said frame and below the glass supporting surface.

2. In a glass bending fixture, a frame, a glass supporting surface carried by the frame and a layer of porous fire brick supported on said frame below the glass supporting surface, said layer being approximately parallel to and coextensive with the glass supporting surface.

References Cited in the file of this patent

UNITED STATES PATENTS 2,348,278    Boyles et al. _____ May 9, 1944